United States Patent
Yong et al.

(10) Patent No.: US 10,609,543 B2
(45) Date of Patent: Mar. 31, 2020

(54) FLEXIBLE BTLE TDS FRAME FORMAT FOR BI-DIRECTIONAL SERVICE DISCOVERY

(71) Applicant: Apple Inc., Cupertino, CA (US)

(72) Inventors: Su Khiong Yong, Palo Alto, CA (US); Christiaan A. Hartman, San Jose, CA (US); Anjali S. Sandesara, Sunnyvale, CA (US); Lawrie Kurian, San Jose, CA (US); Peter N. Heerboth, San Jose, CA (US); Guoqing Li, Cupertino, CA (US); Siegfried Lehmann, Sunnyvale, CA (US); Akshay Mangalam Srivatsa, Santa Clara, CA (US); Yong Liu, Campbell, CA (US); Michael Jason Giles, San Jose, CA (US)

(73) Assignee: Apple Inc., Cupertino, CA (US)

(*) Notice: Subject to any disclaimer, the term of this patent is extended or adjusted under 35 U.S.C. 154(b) by 158 days.

(21) Appl. No.: 15/386,156

(22) Filed: Dec. 21, 2016

(65) Prior Publication Data
US 2017/0164186 A1    Jun. 8, 2017

Related U.S. Application Data

(60) Provisional application No. 62/264,848, filed on Dec. 8, 2015.

(51) Int. Cl.
*H04W 8/00* (2009.01)
*H04W 76/14* (2018.01)
(Continued)

(52) U.S. Cl.
CPC ............ *H04W 8/005* (2013.01); *H04W 4/80* (2018.02); *H04W 76/14* (2018.02); *H04W 84/12* (2013.01)

(58) Field of Classification Search
CPC ....... H04W 8/005; H04W 76/14; H04W 4/80; H04W 84/12
See application file for complete search history.

(56) References Cited

U.S. PATENT DOCUMENTS 8,902,855 B2    12/2014  Etemad et al.
9,319,828 B2*   4/2016   Decuir .................... H04W 4/80
(Continued)

*Primary Examiner* — Chirag G Shah
*Assistant Examiner* — Joshua Smith
(74) *Attorney, Agent, or Firm* — Kowert Hood Munyon Rankin and Goetzel PC; Jeffrey C. Hood; Brian E. Moore

(57) ABSTRACT

In some embodiments, one or more wireless stations operate to configure direct communication with neighboring wireless stations, e.g., direct communication between the wireless stations without utilizing an intermediate access point. Embodiments of the disclosure relate to a mechanism for a device to transmit, via a BTLE (or Bluetooth) interface, a first message indicating an operation associated with a Wi-Fi service (e.g., a service available via a Wi-Fi interface and/or Wi-Fi related interface parameters) to a peer device. The first message may include a service hash that indicates the operation. The service hash may be included in a first data structure. The first data structure may indicate availability of the Wi-Fi service. The device may receive a second message from the peer device indicating that the neighboring wireless station intends to subscribe to or provide the Wi-Fi service, e.g., via Wi-Fi peer-to-peer communications.

20 Claims, 11 Drawing Sheets

(51) Int. Cl.
*H04W 4/80* (2018.01)
*H04W 84/12* (2009.01)

(56) References Cited

U.S. PATENT DOCUMENTS

| | | | | |
|---|---|---|---|---|
| 9,438,491 B1* | 9/2016 | Kwok | ................... | H04L 43/065 |
| 2013/0086169 A1* | 4/2013 | Bruich | ................... | H04L 65/40 |
| | | | | 709/204 |
| 2013/0260813 A1* | 10/2013 | Agerstam | ............. | H04W 48/08 |
| | | | | 455/517 |
| 2014/0269643 A1* | 9/2014 | Sun | ................... | H04W 52/0229 |
| | | | | 370/338 |
| 2014/0302786 A1* | 10/2014 | Kasslin | ................ | H04W 8/005 |
| | | | | 455/41.2 |
| 2015/0071121 A1* | 3/2015 | Patil | ...................... | H04W 40/24 |
| | | | | 370/255 |
| 2015/0237471 A1* | 8/2015 | Li | ........................ | H04W 64/00 |
| | | | | 455/456.2 |
| 2015/0264514 A1* | 9/2015 | Qi | .......................... | H04W 4/70 |
| | | | | 370/338 |
| 2015/0319029 A1* | 11/2015 | Abraham | .............. | H04W 76/14 |
| | | | | 370/310 |
| 2016/0014579 A1* | 1/2016 | Kasilya Sudarsan | ... | H04W 4/16 |
| | | | | 455/417 |
| 2016/0302026 A1 | 10/2016 | Lee et al. | | |

* cited by examiner

| Transport Discovery Data AD Type Code 404 | Org. ID 406 | TDS Flag 408 | Transport Data Length 410 | Org. Data 412 |

FIG. 4A
*(Prior Art)*

| TDS Flag 408 | TDS Flag Definition |
|---|---|
| B0-B1 | Frame Role |
| B2 | Transport Data Incomplete |
| B3-B4 | Transport State |
| B5-B7 | Reserved |

FIG. 4B
*(Prior Art)*

| | TDS Flag Definition |
|---|---|
| TDS Flag 508 | |
| B0-B1 | Frame Role |
| B2 | Transport Data Incomplete |
| B3-B4 | Transport State |
| B5-B7 | Reserved |

FIG. 5B

| AD Length 502 | Transport Discovery Data AD Type Code 504 | Org. ID 506 | TDS Flag 508 | Length 510 | Org. Data 512 |
|---|---|---|---|---|---|

FIG. 5A

| Transport Availability 520 | Active Transport 525 | Service Hash Type 530 | Band Support 535 | Address bit 540 | Reserved 545 | Service Hash/Bloom Filter Bit Array 550 | AdvA or SeekA 555 | Transport Type 560 | Transport Specific Information 565 |
|---|---|---|---|---|---|---|---|---|---|

FIG. 5C

| Example Operation | TDS Flag 508 | | Service Hash Type 530 | | Service Hash/Bloom Filter Bit Array 550 | |
|---|---|---|---|---|---|---|
| | B0 | B1 | B0 | B1 | 6 bytes | 12 bytes |
| Single Publish with one service | 1 | 0 | 0 | 0 | 1 service hash value | |
| Single Publish with multipe services | 1 | 0 | 0 | 1 | | 2 service hash values |
| Single Publish with multipe services | 1 | 0 | 1 | 0 | 6-Octet Bloom Filter | |
| Single Publish with multipe services | 1 | 0 | 1 | 1 | | 12-Octet Bloom Filter |
| Single Subscribe with one service | 0 | 1 | 0 | 0 | 1 service hash value | |
| Single Subscribe with multiple services | 0 | 1 | 1 | 0 | | 2 service hash values |
| Single Subscribe with multiple services | 0 | 1 | 1 | 0 | 6-Octet Bloom Filter | |
| Single Subscribe with multiple services | 0 | 1 | 1 | 1 | | 12-Octet Bloom Filter |
| Concurrent Publish/Subscribe with one service | 1 | 1 | 0 | 0 | | 2 service hash values |
| Concurrent Publish/Subscribe with multiple services | 1 | 1 | 1 | 1 | | 2 6-Octet Bloom Filters |

FIG. 6

| Org. Data 700 | | |
|---|---|---|
| General Format 702 | Service Hash Type 530 | |
| | Band 535 | |
| | Address Bit 540 | |
| | Service Hash/Bloom Filter Bit Array 550 | |
| | AdvA/SeekerA 555 | |
| | Transport Availability 520 | |
| | Transport Type 560 | |
| | Active Transport 525 | |
| NAN Specific Info 704 | Channel 714 | |
| | NAN MAC Address 724 | |
| P2P Specific Information 706 | P2P Device ID 716 | |
| | Channel/Band 726 | |
| Infra Specific Info 708 | Infra BSSID or ESSID 718 | |
| | Infra Channel 728 | |
| Vendor Specific Info 710 | | |

FIG. 7

| Transport | Advertiser 906 948 | | Seeker 908 958 | | Advertiser 906 966 | |
|---|---|---|---|---|---|---|
| | Active Transport 925 | Transport Availability 920 | Active Transport 925 | Transport Availability 920 | Active Transport 925 | Transport Availability 920 |
| NAN | Off | Yes | On | Yes | On | Yes |
| P2P | Off | Yes | Off | No | Off | Yes |
| Infra | Off | No | Off | Yes | Off | No |

| Org. Data 1000 | | 948 | 958 | 966 |
|---|---|---|---|---|
| General Format 1002 | Service Hash Type 1030 | YES | YES | YES |
| | Band 1035 | YES | YES | YES |
| | Address Bit 1040 | YES | YES | YES |
| | Service Hash/Bloom Filter Bit Array 1050 | YES | YES | YES |
| | AdvA/SeekerA 1055 | NO | YES | YES |
| | Transport Availability 920 | YES | YES | YES |
| | Transport Type 1060 | YES | YES | YES |
| | Active Transport 925 | YES | YES | YES |
| NAN Specific Info 1004 | Channel 1014 | MAYBE | YES | YES |
| | NAN MAC Address 1024 | MAYBE | YES | YES |
| P2P Specific Information 1006 | P2P Device ID 1016 | MAYBE | YES | YES |
| | Channel/Band 1026 | MAYBE | YES | YES |
| Infra Specific Info 1008 | Infra BSSID or ESSID 1018 | MAYBE | YES | YES |
| | Infra Channel 1028 | MAYBE | YES | YES |
| Vendor Specific Info 1010 | | MAYBE | YES | YES |

*FIG. 10*

FLEXIBLE BTLE TDS FRAME FORMAT FOR BI-DIRECTIONAL SERVICE DISCOVERY

PRIORITY DATA

This application claims benefit of priority to U.S. Provisional Application Ser. No. 62/264,848, titled "Flexible BTLE TDS Frame Format for Bi-Directional Service Discovery", filed Dec. 8, 2015, by Su Khiong Yong, Christiaan A. Hartman, Anjali S. Sandesara, Lawrie Kurian, Peter N. Heerboth, Guoqing Li, Siegfried Lehmann, Akshay Mangalam Srivatsa, Yong Liu, and Michael Jason Giles, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer devices to discover one another via Bluetooth low energy.

Some embodiments relate to a wireless station that includes one or more antennas, one or more radios, and one or more processors coupled (directly or indirectly) to the radios. At least one radio is configured to perform Wi-Fi and/or Bluetooth (or Bluetooth low energy (BTLE) communications, e.g., via Wi-Fi and/or Bluetooth (or BTLE) interfaces. The wireless station may perform voice and/or data communications, as well as any or all of the methods described herein.

In some embodiments, one or more wireless stations operate to configure direct communication with neighboring wireless stations, e.g., direct communication between the wireless stations without utilizing an intermediate access point. Embodiments of the disclosure relate to a mechanism for peer devices to discover one another via Bluetooth low energy. In some embodiments, peer devices may implement service discovery via Bluetooth or BLTE communications.

In some embodiments, a wireless station may transmit, via a BTLE (or Bluetooth) interface, a first message indicating an operation associated with a Wi-Fi service (e.g., services available via the Wi-Fi interface and/or Wi-Fi related interface parameters) to a neighboring wireless station. In some embodiments, the first message may include a service hash that indicates the operation. In some embodiments, the service hash may be included in a first data structure. In some embodiments, the first data structure may indicate availability of the Wi-Fi service. The wireless station may receive a second message from the neighboring wireless station indicating that the neighboring wireless station intends to subscribe to or provide the Wi-Fi service, e.g., via Wi-Fi peer-to-peer communications.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 4A-B illustrate examples of advertising packet formats for service discovery via Bluetooth low energy, according to existing implementations.

FIG. 5A illustrates an example of a transport discovery service (TDS) frame format, according to some embodiments.

FIG. 5B illustrates an example of a TDS flag frame format, according to some embodiments.

FIG. 5C illustrates an example of an organization data field frame format, according to some embodiments.

FIG. 6 illustrates an example of values of a TDS flag field, a service hash type field, and a service hash/Bloom filter bit array field for various operations, according to some embodiments.

FIG. 7 illustrates an example of a possible format of an organization data field 700 according to some embodiments.

FIG. 10 illustrates an example of values of the TDS flag field, service hash type field, and service hash/Bloom filter bit array field for various messages, according to some embodiments.

Figure 1:
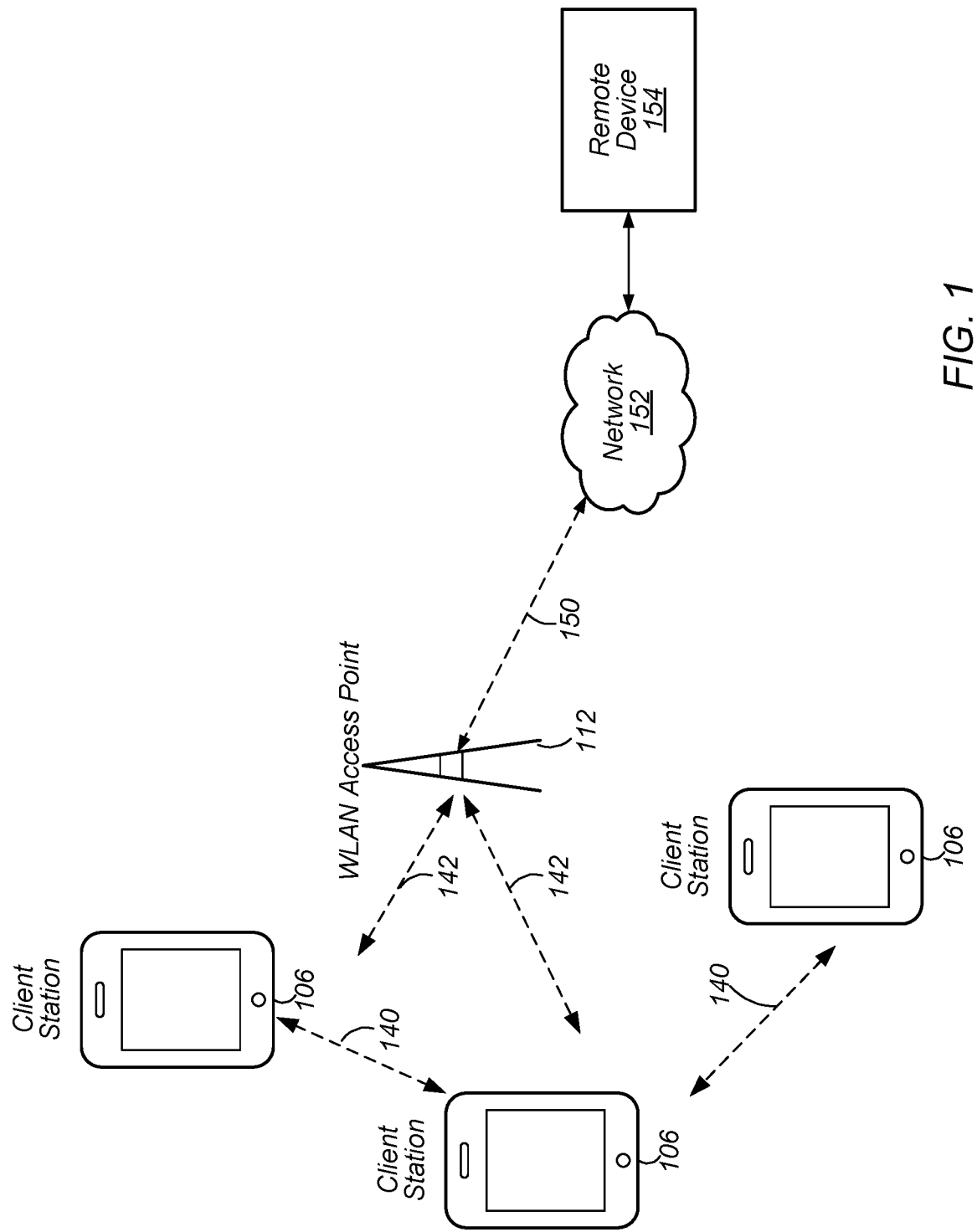
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a er of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to transmit, via a BTLE (or Bluetooth) interface, a first message indicating an operation associated with a Wi-Fi service to a neighboring wireless device. In some embodiments, the first message may include a service hash that indicates the operation. In some embodiments, the service hash may be included in a first data structure. In some embodiments, the first data structure may indicate availability of the Wi-Fi service. The wireless device 106 may receive a second message from the neighboring wireless device indicating that the neighboring wireless station intends to subscribe to or provide the Wi-Fi service, e.g., via Wi-Fi peer-to-peer communications.

Figure 2:
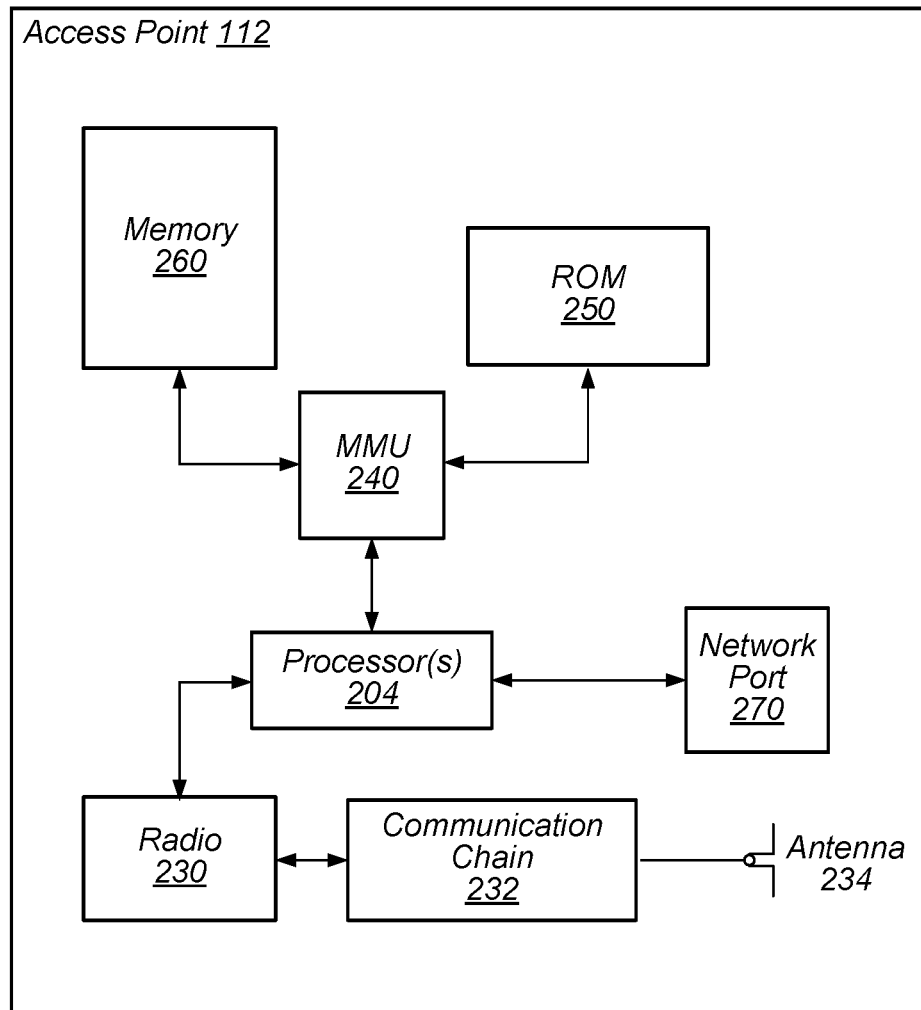
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to transmit, via a BTLE (or Bluetooth) interface, a first message indicating an operation associated with a Wi-Fi service to a neighboring wireless device. In some embodiments, the first message may include a service hash that indicates the operation. In some embodiments, the service hash may be included in a first data structure. In some embodiments, the first data structure may indicate availability of the Wi-Fi service. The AP 112 may receive a second message from the neighboring wireless device indicating that the neighboring wireless station intends to subscribe to or provide the Wi-Fi service, e.g., via Wi-Fi peer-to-peer communications.

Figure 3:
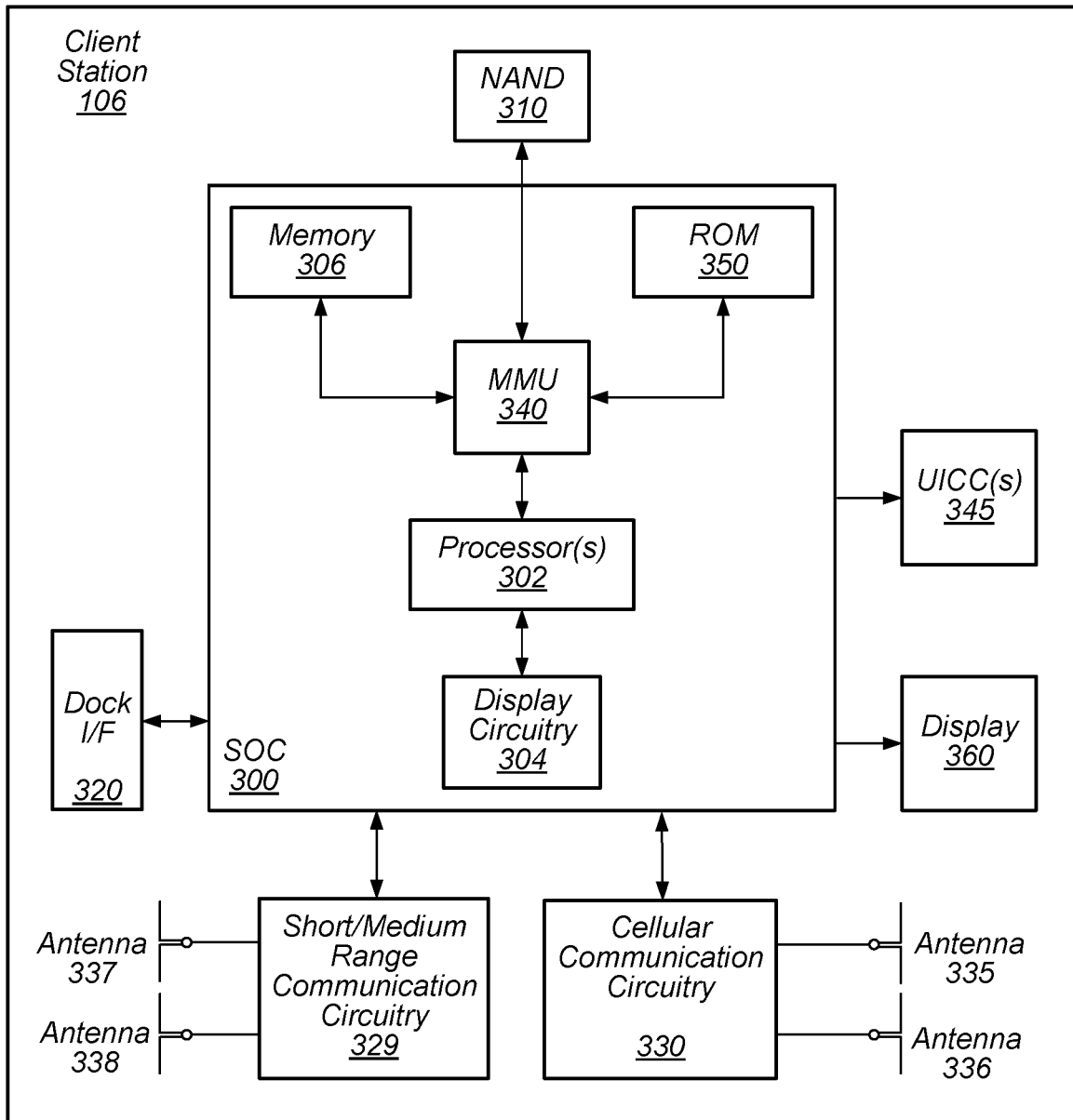
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to transmit, via a BTLE (or Bluetooth) interface, a first message indicating an operation associated with a Wi-Fi service to a neighboring wireless station. In some embodiments, the first message may include a service hash that indicates the operation. In some embodiments, the service hash may be included in a first data structure. In some embodiments, the first data structure may indicate availability of the Wi-Fi service. The wireless station 106 may receive a second message from the neighboring wireless device indicating that the neighboring wireless station intends to subscribe to or provide the Wi-Fi service, e.g., via Wi-Fi peer-to-peer communications.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for a wireless station (including, but not limited to, a NAN device) to discover neighboring wireless stations and exchange service information via Bluetooth communications.

Bluetooth Low Energy Transport Discovery Service Frame Format for Bi-Directional Service Discovery In some implementations, Bluetooth Low Energy (BTLE) provides a transport discovery service (TDS) mechanism for service discovery over BTLE. In particular, TDS implements an advertising packet (ADV) with AD type transport discovery data (TDD) for service discovery over (or via) BTLE. In some implementations, the ADV packet format with AD type TDD provides a generic container (e.g., a data structure) via a transport data (or organization data) attribute or field. The transport data attribute (field) may be limited (or constrained) to 26 bytes of data. FIGS. 4A-B illustrate examples of advertising packet formats for service discovery via Bluetooth low energy, according to existing implementations.

As FIG. 4A illustrates, the ADV packet format may include 1 byte for a transport discovery data AD type code field 404, 1 byte for organization identifier (or identity) (org. ID) field 406, 1 byte for a TDS flag field 408, 1 byte for transport data length field 410, and up to 26 bytes for transport data field 412. The transport discovery data AD type code field 404 may be set to TDD AD type code, the org. ID field (or attribute) 406 may be set to 0x01 for Bluetooth special interest group (SIG) or to 0x02 for Wi-Fi Alliance (WFA). In addition, as illustrated by FIG. 4B, the TDS flag field (or attribute) 408 may include bits for frame role, transport data incomplete, and transport state. In particular, the transport state may be specified by 2 bits (e.g., bits 3-4 of the TDS flag field 408) with 0b00 indicated transport state is off, 0b01 indicating that an interface is on and available, 0b10 indicating that an interface is on and temporality unavailable, and 0b11 reserved. In addition, bits 5-7 of the TDS flag field 408 may be reserved.

Thus, implementations may have only one bit (the transport state bit of the TDS flag field) for indicating whether an alternate transport state is on or off. However, Wi-Fi may include multiple interfaces (e.g., NAN, Wi-Fi Direct, and/or Infrastructure) which may or may not be on (e.g., enabled). In addition, implementations may limit the size of an organization data field, thus limiting an amount of service information that may be included in the ADV packet. Such limitations may substantially hinder support of multiple services due to limited packet size. Hence, in some implementations, support of multiple services may utilize single advertising events (AEs) performed serially which may lead to increased discovery time and reduced battery life. Further, the ADV packet format is limited to perform either publish/advertise or subscribe/seek operations, but not both. Hence, a device that has services to be published and subscribed may need different AEs to perform publish and subscribe operations separately which may also lead to increased discovery time and reduced battery life.

Embodiments described herein provide a mechanism for a wireless device to implement service discovery via BTLE. In some embodiments, a generic service discovery mechanism is implemented using the transport data field of the ADV packet. In some embodiments, a packet format may be implemented using a portion of the transport data field to discover services available via Wi-Fi peer-to-peer communication protocols such as Wi-Fi Direct and/or NAN. In some embodiments, the generic mechanism may be implemented for NAN pre-session (or pre-datapath, pre-datalink) service discovery. In some embodiments, the generic mechanism may be implemented for bi-directional service discovery. Note that embodiments described herein may be implemented on a client station, such as client station 106.

In some embodiments, a flexible BTLE TDS frame format for bi-directional service may include fields (or attributes) as illustrated by the examples of FIGS. 5A-C. As FIG. 5A illustrates, a flexible BTLE TDS frame may include any or all of an advertised (AD) length field 502, a transport discovery data AD type code field 504, an organization (org.) identifier (ID) field 506, a TDS flag field 508, a length field 510, and/or an org. data field 512. In some embodiments, an AD length field (or attribute) 502 may include 1 byte, a transport discovery data AD type code field (or attribute) 504 may include 1 byte, an org. ID field (or attribute) 506 may include 1 byte, a TDS flag field (or attribute) 508 may include 1 byte, a length field (or attribute) 510 may include 1 byte, and an organization (or transport) data field (or attribute) 512 may include up to 26 bytes. Note that these values are exemplary only and other values/sizes of various fields are contemplated.

FIG. 5B illustrates an example of a TDS flag field frame format, according to some embodiments. As shown, in some implementations, the first two bits of the TDS flag field 508 may define a frame role field (or attribute), the next bit may define a transport data incomplete field, the next two bits may define a transport state field, and the last three bits may be reserved. The frame role field may indicate whether a device (such as client station 106) is a seeker (0b01), a provider (0b10), or both a seeker and a provider (0b11). The transport incomplete field may indicate whether more data is available in a GATT database. The transport state field may indicate whether an alternate transport interface is off (0b00), on and available (0b01), or on and temporarily unavailable (0b10). In other implementations, the fields can be structured in accordance with other sizes and/or arrangements.

FIG. 5C illustrates an example of an organization data field frame format, according to some embodiments. As shown, the organization data (org. data) field (or attribute) 512 may include one or more fields (attributes or data structures) such as any/all of a transport availability field 520, an active transport field 525, a service hash type field 530, a band support field 535, an address bit field 540, a reserved field 545, a service hash/Bloom filter bit array field 550, an AdvA or SeekA field 555, a transport type field 560, and/or a transport specific information field 565. In some embodiments, each field of the organization data field may have a specified number of bits or bytes.

In some embodiments, the transport availability field 520 may include 1 byte. A first bit (such as B0) may indicate that an interface for infrastructure (e.g., communication with an access point, such as access point 102) is available. A second bit (such as B1) may indicate that a peer-to-peer interface is available and a third bit (such as B2) may indicate that a NAN interface is available. In some embodiments, the remaining bits may be reserved and/or useable for other purposes, such as vendor specific information.

In some embodiments, the active transport field 525 may include 1 byte. A first bit (such as B0) may indicate whether an infrastructure interface is on or off. A second bit (such as B1) may indicate whether a peer-to-peer interface is on or off and a third bit (such as B2) may indicate whether a NAN interface is on or off. In some embodiments, the remaining bits may be reserved and/or useable for, e.g., vendor specific information.

In some embodiments, the service hash type field 530 may include two bits. A first bit (such as B0) may be set to "0" to indicate a service hash or "1" to indicate usage of a Bloom filter. In addition, a second bit (such as B1) may be set to "0" to indicate a first length for a service hash or "1" to indicate a second length for a service hash. For example, in some embodiments, a "0" may indicate a 6-octet service hash and a "1" may indicate a 12-octet service hash. Note that in some embodiments, the second bit may be only set to "0" when the first two bits of the TDS flag have a value of "01' or "10" indicating a device is a seeker only or a provider only.

In some embodiments, the band support field 535 may include four bits. A first bit may indicate 2.4 GHz band support, a second bit may indicate 5 GHz band support, a third bit may indicate IEEE 802.11ah support, and a fourth bit may indicate 60 GHz support. In other embodiments, additional or alternative bands/protocols can be identified. Additionally, the address bit field may be a single bit indicating whether AdvA or SeekA field 555 is empty or present and the reserved field may be 1 bit.

In some embodiments, the service hash/Bloom filter bit array field 550 may be 6 or 12 bytes. In some embodiments, interpretation of the service hash/Bloom filter bit array field 550 may be dependent upon the value of the service hash type field 530. For example, if a first bit of the service hash type field is set to "0", the service hash/Bloom filter bit array field may be interpreted as one or two 6-octet service hash(s). However, if the first bit of the service hash type field is set to "1", then the service hash/Bloom filter bit array field may be interpreted as a one or two-octet Bloom filter bit array.

In some embodiments, interpretation of the service hash/Bloom filter bit array field 550 may be dependent upon the value of the first two bits of the TDS flag field 506. For example, if the first two bits of the TDS flag field 506 are set to "01", then the service hash/Bloom filter bit array field 550 may be used for subscribe only and the length may be 6 or 12 octets as indicated by the second bit of the service hash type field 530. As another example, if the first two bits of the TDS flag field 506 are set to "10", the service hash/Bloom filter bit array field 550 may be used for publish only and the length may be 6 or 12 octets as indicated by the second bit of the service hash type field 530. As a further example, if the first two bits of the TDS flag field 506 are set to "11", the service hash/Bloom filter bit array field 550 may be used for subscribe and publish and the length may be a 12 octets Bloom filter array (or two 6-octect hashes) as indicated by the second bit of the service hash type field 530. In addition, a first 6 octet hash may be for subscribe and a second 6-octet hash may be for publish.

In some embodiments, the AdvA or SeekA field 555 may be 0 or 6 bytes. The value of the AdvA or SeekA field 555 may be dependent upon the value of the address bit field 540.

In some embodiments, the transport type field 560 may be 1 byte. A first bit of the transport type field 560 may indicate whether infrastructure information is present and a second bit may indicate whether P2P information is present and a third bit may indicate whether NAN information is present. The remaining bits may be reserved and/or indicate whether vendor specific information is present.

In some embodiments, the transport specific information field 565 may use the remaining bytes of the org. data field 512.

In some embodiments, the organization data (org. data) field (or attribute) 512 may be customized (e.g., designed) to perform operations such as single publish operation with one service, single publish operation with multiple services, single subscribe operation with one service, single subscribe operation with multiple services, concurrent (or substantially concurrent) publish and subscribe operation with single service in each operation, concurrent (or substantially concurrent) publish and subscribe operation with multiple services in each operation, sending a response in responding to a subscribe or publish operation when there is a service match to turn on a relevant Wi-Fi interface, and/or directly turning on a relevant Wi-Fi interface during a publish and/or subscribe operation.

FIG. 6 illustrates an example of values of the TDS flag field 508, service hash type field 530, and service hash/Bloom filter bit array field 550 for various operations, according to embodiments. Other sizes/arrangements of the example fields also can be implemented. For example, for a single subscribe operation with one service, a first bit (B0) of TDS flag field 508 may have a value of "1" and a second bit (B1) of TDS flag field 508 may have a value of "0". In addition, for the single subscribe operation with one service, a first bit (B0) of service hash type field 530 may have a value of "0" and a second bit (B1) of service hash type field 530 may have a value of "0" which may indicate that service hash/bloom filter bit array field 550 may include one service hash value of 6 bytes and may be 6 bytes long.

As another example, for a single subscribe operation with multiple services, the first bit (B0) of TDS flag field 508 may have a value of "1" and the second bit (B1) of TDS flag field 508 may have a value of "0". In addition, for the single subscribe operation with multiple services, the first bit (B0) of service hash type field 530 may have a value of "0" and the second bit (B1) of service hash type field 530 may have a value of "1" which may indicate that service hash/bloom filter bit array field 550 may include two service hash values of 6 bytes and may be 12 bytes long.

As a further example, for a single subscribe operation with multiple services, the first bit (B0) of TDS flag field 508 may have a value of "1" and the second bit (B1) of TDS flag field 508 may have a value of "0". In addition, for the single subscribe operation with multiple services, the first bit (B0) of service hash type field 530 may have a value of "1" and the second bit (B1) of service hash type field 530 may have a value of "0" which may indicate that service hash/bloom filter bit array field 550 may include a 6-octet Bloom Filter and may be 6 bytes long.

In another example, for a single subscribe operation with multiple services, the first bit (B0) of TDS flag field 508 may have a value of "1" and the second bit (B1) of TDS flag field 508 may have a value of "0". In addition, for the single subscribe operation with multiple services, the first bit (B0) of service hash type field 530 may have a value of "1" and the second bit (B1) of service hash type field 530 may have a value of "1" which may indicate that service hash/bloom filter bit array field 550 may include a 12-octet Bloom Filter and may be 12 bytes long.

As an example of a subscribe operation, for a single subscribe operation with one service, the first bit (B0) of TDS flag field 508 may have a value of "0" and the second bit (B1) of TDS flag field 508 may have a value of "1". In addition, for the single subscribe operation with one service, the first bit (B0) of service hash type field 530 may have a value of "0" and the second bit (B1) of service hash type field 530 may have a value of "0" which may indicate that service hash/bloom filter bit array field 550 may include one service hash value of 6 bytes and may be 6 bytes long.

As another example, for a single subscribe operation with multiple services, the first bit (B0) of TDS flag field 508 may have a value of "0" and the second bit (B1) of TDS flag field 508 may have a value of "1". In addition, for the single subscribe operation with multiple services, the first bit (B0) of service hash type field 530 may have a value of "0" and the second bit (B1) of service hash type field 530 may have a value of "1" which may indicate that service hash/bloom filter bit array field 550 may include two service hash values of 6 bytes and may be 12 bytes long.

As a further example, for a single subscribe operation with multiple services, the first bit (B0) of TDS flag field 508 may have a value of "0" and the second bit (B1) of TDS flag field 508 may have a value of "1". In addition, for the single subscribe operation with multiple services, the first bit (B0) of service hash type field 530 may have a value of "1" and the second bit (B1) of service hash type field 530 may have a value of "0" which may indicate that service hash/bloom filter bit array field 550 may include a 6-octet Bloom Filter and may be 6 bytes long.

In another example, for a single subscribe operation with multiple services, the first bit (B0) of TDS flag field 508 may have a value of "0" and the second bit (B1) of TDS flag field 508 may have a value of "1". In addition, for the single subscribe operation with multiple services, the first bit (B0) of service hash type field 530 may have a value of "1" and the second bit (B1) of service hash type field 530 may have a value of "1" which may indicate that service hash/bloom filter bit array field 550 may include a 12-octet Bloom Filter and may be 12 bytes long.

In an example, for substantially concurrent publish and subscribe operations with a single publish service and a single subscribe service, the first bit (B0) of TDS flag field 508 may have a value of "1" and the second bit (B1) of TDS flag field 508 may have a value of "1". In addition, for the single subscribe operation with one service, the first bit (B0) of service hash type field 530 may have a value of "0" and the second bit (B1) of service hash type field 530 may have a value of "0" which may indicate that service hash/bloom filter bit array field 550 may include two service hash values of 6 bytes and may be 12 bytes long.

In another example, for substantially concurrent publish and subscribe operations with a single publish service and a single subscribe service, the first bit (B0) of TDS flag field 508 may have a value of "1" and the second bit (B1) of TDS flag field 508 may have a value of "1". In addition, for the single subscribe operation with multiple services, the first bit (B0) of service hash type field 530 may have a value of "1" and the second bit (B1) of service hash type field 530 may have a value of "1" which may indicate that service hash/ bloom filter bit array field 550 may include two 6-octet Bloom Filters and may be 12 bytes long.

FIG. 7 illustrates an example of a possible format of an organization data field 700 according to some embodiments. As shown, the organization data field 700 may include a general format field (attribute/data structure) 702, a NAN specific information field 704, a peer-to-peer specific information field 706, an infrastructure specific information field 708, and a vendor specific information field 710. (Original) The general format field 702 may include parameters (or fields/attributes/data structures) such as service hash type 530, band field 535, address bit field 540, service hash/ Bloom filter bit array field 550, AdvA/SeekerA field 555, transport availability field 520, active transport field 525, and transport type. (Original) The NAN specific information field 704 may include channel and NAN MAC address fields 714 and 724, the peer-to-peer (P2P) specific information field 706 may include P2P device ID and channel/band fields 716 and 726, the infrastructure specific information field 708 may include infra BSSID or ESSID and infra channel fields 718 and 728, and the vendor specific information field 710 may include vendor defined fields.

For example, channel field (or attribute) 714 may be 1 byte and may include information regarding one or more NAN channels, e.g., which NAN channel a device may be available on for further communications. In addition, NAN MAC address field 724 may be 6 bytes and may include a MAC address to be used for a data interface. Further, P2P device ID may be 6 bytes and may include a MAC address of a P2P (peer-to-peer) device and channel/band field 726 may be 2 bytes and may include a preferred operating channel and/or a preferred frequency band. Additionally, infra BSSID or ESSID field 718 may by 6 bytes and may aid in locating which access point a peer is associated with and infra channel field 728 may be 1 byte and may aid in learning a peer's infra channel.

Figure 8A:
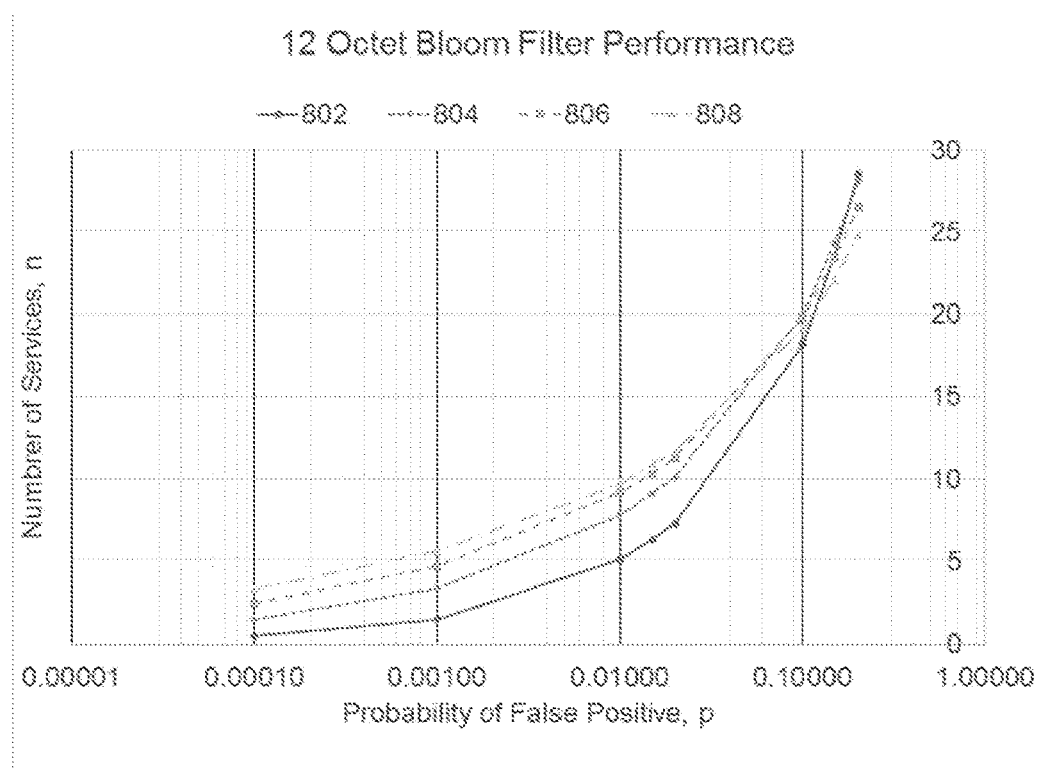
FIGS. 8A-B illustrate fixed length Bloom filter performance predictions for 6 octet and 12 octet Bloom filters, according to some embodiments.
Figure 8B:
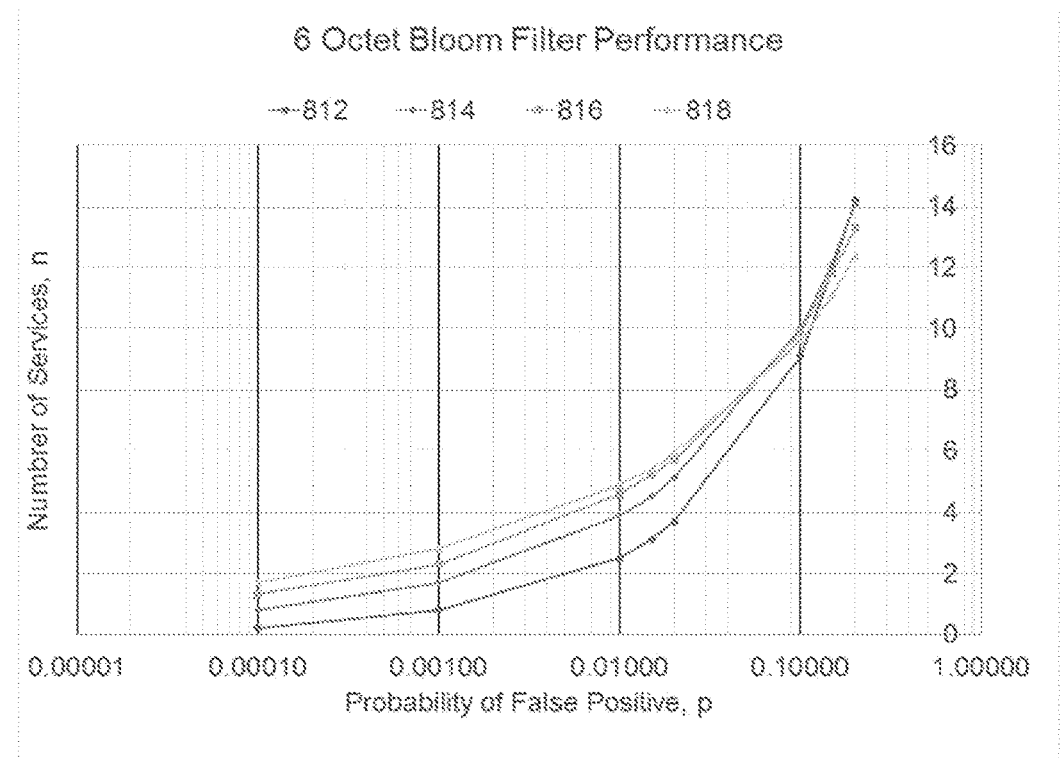

FIGS. 8A-B illustrate fixed length Bloom filter performance predictions for 6 octet and 12 octet Bloom filters, according to some embodiments. As illustrated, in some embodiments, usage of four hash functions would allow support for at least 3 services for a 6 octet Bloom filter and 6 services of a 12 octet Bloom filter assuming an upper bound of 4.6 and 9.1 supported services, respectively, based on a false positive probability of one percent.

Figures 9A, 9B:
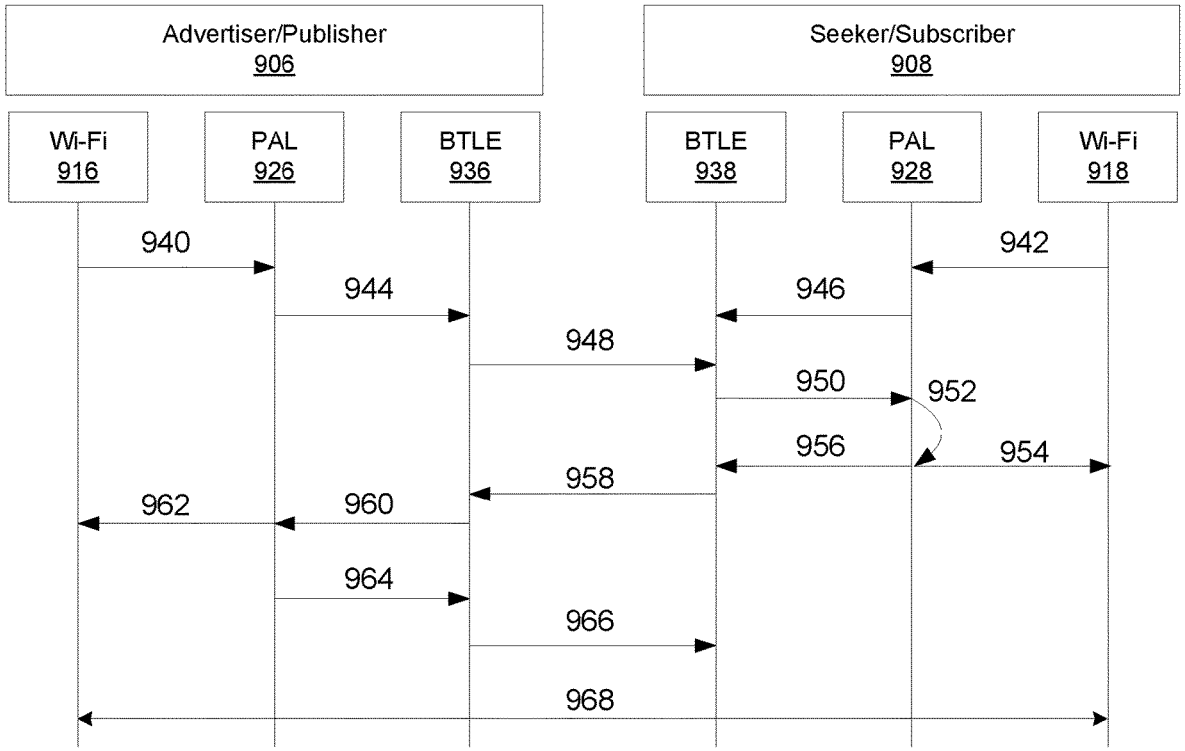
FIG. 9A illustrates an example of messaging between an advertising device and a seeking device for service discovery via Bluetooth Low Energy, according to some embodiments.
FIG. 9B illustrates an example of values of various organization data fields for various messages, according to some embodiments.

FIG. 9A illustrates an example of messaging between an advertising device and a seeking device for service discovery via Bluetooth Low Energy (BTLE), according to some embodiments. FIG. 9B illustrates an example of values of various organization data fields for various messages, according to some embodiments. In addition, FIG. 10 illustrates an example of values of the TDS flag field, service hash type field, and service hash/Bloom filter bit array field for various messages, according to some embodiments.

The messaging (signaling) shown in FIG. 9A may be used in conjunction with any of the systems or devices shown in the above Figures, among other devices. In various embodiments, some of the messages shown may be performed concurrently, in a different order than shown, or may be omitted. Additional messages may also be exchanged as desired.

As illustrated, an advertiser/publisher 906 (e.g., such as client station 106) may determine to advertise (or publish) an unsolicited Wi-Fi service (e.g., a service available via a Wi-Fi interface and/or Wi-Fi related interface parameters) via a Bluetooth low energy (BLTE) interface 936. The Wi-Fi service may be available via Wi-Fi interface 916 of advertiser/publisher 906. Thus, Wi-Fi interface 916 may transmit (send) a message 940 to an application service platform (ASP) 2.0 interface or, more generally, a protocol adaptation layer (PAL) 926 of advertiser/publisher 906 indicating advertisement of the Wi-Fi service. In addition, PAL 926 may forward the advertisement to BTLE interface 936 via message 944.

Similarly, a seeker/subscriber 908 (e.g., such as client station 106) may determine to passively seek (or subscribe) to a Wi-Fi service via a BLTE interface 938 of seeker/ subscriber 908. The Wi-Fi service may be subscribed to via Wi-Fi interface 918. Thus, Wi-Fi interface 918 may transmit (send) message 942 to PAL 928 indicating seeking of the Wi-Fi service. In addition, PAL 928 may forward the seeking of the Wi-Fi service to BTLE interface 938 via message 946.

BTLE interface 936 may send a message 948 to BTLE interface 938 that may indicate that advertiser/publisher 906 is available for NAN or P2P services via a transport availability field 920 as illustrated in FIG. 9B. In addition, an active transport field 925 may indicate that NAN, P2P, and Infra interfaces are currently off (or unavailable) on advertiser/publisher 906. In addition, as illustrated by FIG. 10, message 948 may include various data in an org. data field 100. For example, message 948 may include general format field 1002, NAN specific information field 1004, P2P specific information field 1006, Infra specific information field 1006, and/or vendor specific information field 1010. The general format field 1002 may include a service hash type field 1030, a band field 1035, an address bit 1040, a service hash/bloom filter bit array field 1050, the transport availability field 920, a transport type field 1060, and/or an active transport field 925. Further, NAN specific information field 1004 may include channel and NAN MAC address fields 1014 and 1024, P2P specific information field 1006 may include P2P device ID and channel/band fields 1016 and 1026, and infra specific information field 1008 may include infra BSSID or ESSID and infra channel fields 1018 and 1028. Note that the field/attributes illustrated in FIG. 10 may be similar to and/or the same as the fields/attributes described above.

In response, BTLE interface 938 may forward the indication received in message 948 to PAL 928 via message 950. PAL may generate message 952 indicating a service match and forward the service match to Wi-Fi interface 918 via message 954 and to BTLE interface 938 via message 956.

BTLE interface 938 may respond to BTLE interface 936 via message 958 that may indicate that seeker/subscriber 908 has activated its Wi-Fi interface (e.g., via the active transport field 925 in message 958 as illustrated in FIG. 9B) and that it is available for both infra and NAN services via the transport availability field 920 as illustrated in FIG. 9B. In addition, as illustrated by FIG. 10, message 958 may include various data in an org. data field 100. For example, message 948 may include general format field 1002, NAN specific information field 1004, P2P specific information field 1006, Infra specific information field 1006, and/or vendor specific information field 1010. The general format field 1002 may include a service hash type field 1030, a band field 1035, an address bit 1040, a service hash/bloom filter bit array field 1050, AdvA/SeekerA field 1055, the transport availability field 920, a transport type field 1060, and/or an active transport field 925. Further, NAN specific information field 1004 may include channel and NAN MAC address fields 1014 and 1024, P2P specific information field 1006 may include P2P device ID and channel/band fields 1016 and 1026, and infra specific information field 1008 may include infra BSSID or ESSID and infra channel fields 1018 and 1028. Note that the field/attributes illustrated in FIG. 10 may be similar to and/or the same as the fields/attributes described above.

In response, BTLE interface 936 may notify PAL 926 that seeker/subscriber 908 has activated its Wi-Fi interface via message 960. PAL 926 may forward the notification to Wi-Fi interface 916 via message 962 which may also indicate that Wi-Fi interface 916 should be enabled (e.g., turned on). In addition, PAL may transmit an indication that Wi-Fi interface 916 is active to BTLE interface 936 via message 964.

BTLE interface 936 may transmit message 966 to BTLE interface 938 indicating that its Wi-Fi interface is active (e.g., via active transport field 925) and available for NAN and P2P communication (e.g., via transport availability 920) as illustrated in FIG. 9B. In addition, as illustrated by FIG. 10, message 966 may include various data in an org. data field 100. For example, message 948 may include general format field 1002, NAN specific information field 1004, P2P specific information field 1006, Infra specific information field 1006, and/or vendor specific information field 1010. The general format field 1002 may include a service hash type field 1030, a band field 1035, an address bit 1040, a service hash/bloom filter bit array field 1050, AdvA/SeekerA field 1055, the transport availability field 920, a transport type field 1060, and/or an active transport field 925.

Further, NAN specific information field 1004 may include channel and NAN MAC address fields 1014 and 1024, P2P specific information field 1006 may include P2P device ID and channel/band fields 1016 and 1026, and infra specific information field 1008 may include infra BSSID or ESSID and infra channel fields 1018 and 1028. Note that the field/attributes illustrated in FIG. 10 may be similar to and/or the same as the fields/attributes described above.

Wi-Fi interfaces 916 and 918 may then exchange messages 968 for further discovery and connection.

Figure 11:
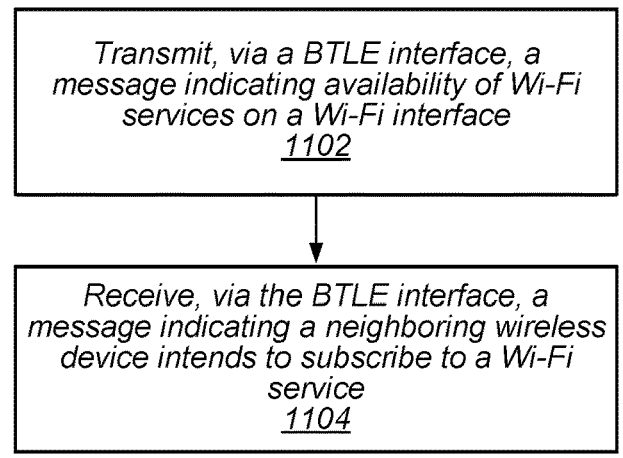
FIGS. 11-13 illustrate block diagrams of examples of methods for service discovery via Bluetooth Low Energy, according to some embodiments.

FIG. 11 illustrates a block diagram of an example of a method for service discovery via Bluetooth Low Energy, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a device (or a memory medium, a processor, and/or an integrated circuit of the device), such as client station 106, may transmit (or send), via a Bluetooth Low Energy (BTLE) or Bluetooth interface, a first message to a neighboring wireless station that indicates availability (e.g., an advertisement or publishing) of a service available via a Wi-Fi interface of the device and/or Wi-Fi related interface parameters (e.g., a Wi-Fi service). In some embodiments, the first message may include a first data structure that indicates availability of the Wi-Fi service(s).

At 1104, the device may receive, via the BTLE interface, a second message from the neighboring wireless station that indicates that the neighboring wireless device intends to subscribe to the Wi-Fi service(s). In some embodiments, the second message may include a second data structure that indicates that the neighboring wireless device intends to subscribe to the Wi-Fi service(s). In some embodiments, the second message may further include information indicating that the neighboring wireless station has activated a Wi-Fi interface for peer-to-peer communications with the device.

In some embodiments, the first and/or second data structure may include any or all of a transport availability field, an active transport field, a service hash type field, a band support field, an address bit field, a reserved field, a service hash/Bloom filter bit array field, an AdvA or SeekA field, a transport type field, and/or a transport specific information field. In some embodiments, the first and/or second data structure may include any or all of a general format field, a NAN specific information field, a peer-to-peer specific information field, an infrastructure specific information field, and/or a vendor specific information field.

In some embodiments, the general format field may include any or all of a service hash type field, a band field, an address bit field, a service hash/Bloom filter bit array field, an AdvA/SeekerA field, a transport availability field, an active transports field, and/or a transport type field.

In some embodiments, the device may transmit, via the BTLE interface, a third message to the neighboring wireless station that indicates that the device has activated a Wi-Fi interface for communications with the neighboring wireless station. In some embodiments, the third message may include a third data structure indicating that the wireless station has activated a Wi-Fi interface for communications with the neighboring wireless station. In some embodiments, the third data structure may include any or all of a transport availability field, an active transport field, a service hash type field, a band support field, an address bit field, a reserved field, a service hash/Bloom filter bit array field, an AdvA or SeekA field, a transport type field, and/or a transport specific information field. In some embodiments, the third data structure may include any or all of a general format field, a NAN specific information field, a peer-to-peer specific information field, an infrastructure specific information field, and/or a vendor specific information field. In some embodiments, the device may perform peer-to-peer communications with the neighboring wireless station. In some embodiments, the device may perform the peer-to-peer communications with the neighboring wireless station according to the neighbor awareness networking protocol.

In some embodiments, the first, second, and/or third data structure may include one or more bits indicating how to interpret a value of a service hash. In some embodiments, the one or more bits may further indicate how to interpret octets of a Bloom filter.

In some embodiments, one of a service hash and an octet of a Bloom filter included in one of the first, second, and/or third data structures may indicate an operation of the device and/or neighboring wireless station. In some embodiments, the operation may include one of a single publish operation with one Wi-Fi service, a single publish operation with multiple Wi-Fi services, a single subscribe operation with one Wi-Fi service, a single subscribe operation with multiple Wi-Fi services, a concurrent (or substantially concurrent) publish and subscribe operation with one subscribe Wi-Fi service and one publish Wi-Fi service, a concurrent (or substantially concurrent) publish and subscribe operation with multiple publish and subscribe Wi-Fi services, sending a response in responding to a subscribe or publish operation when there is a service match to turn on a relevant Wi-Fi interface, and/or directly turning on a relevant Wi-Fi interface during a publish and/or subscribe operation. In some embodiments, the operation may include one of a single publish operation with one Wi-Fi service via a service hash value, a single publish operation with multiple Wi-Fi services via multiple service hash values, a single publish operation with multiple Wi-Fi services via a six octet Bloom filter, a single publish operation with multiple Wi-Fi services via a twelve octet Bloom filter, a single subscribe operation with one Wi-Fi service via a service hash value, a single subscribe operation with multiple Wi-Fi services via multiple service hash values, a single subscribe operation with multiple Wi-Fi services via a six octet Bloom filter, a single subscribe operation with multiple Wi-Fi services via a twelve octet Bloom filter, concurrent (or substantially concurrent) publish and subscribe operation with one subscribe Wi-Fi service and one publish Wi-Fi service via a twelve octet Bloom filter, and/or concurrent (or substantially concurrent) publish and subscribe operation with multiple Wi-Fi services in each operation via multiple service hash values.

Figure 12:
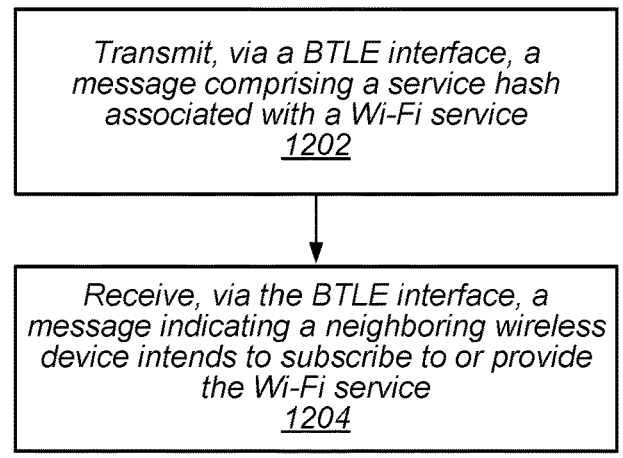

FIG. 12 illustrates a block diagram of an example of another method for service discovery via Bluetooth Low Energy, according to some embodiments. The method shown in FIG. 12 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1202, a device (or a memory medium, a processor, and/or an integrated circuit of the device), such as client station 106, may transmit (or send), via a Bluetooth Low Energy (BTLE) or Bluetooth interface, a first message to a neighboring wireless station that includes a service hash associated with a Wi-Fi service (e.g., a service available via a Wi-Fi interface and/or Wi-Fi related interface parameters). In some embodiments, the service hash may be included in a first data structure and the first data structure may indicate availability of the Wi-Fi service(s). In some embodiments, the first data structure may include any or all of a transport availability field, an active transport field, a service hash type field, a band support field, an address bit field, a reserved field, a service hash/Bloom filter bit array field, an AdvA or SeekA field, a transport type field, and/or a transport specific information field. In some embodiments, the first data structure may include any or all of a general format field, a NAN specific information field, a peer-to-peer specific information field, an infrastructure specific information field, and/or a vendor specific information field.

In some embodiments, the general format field may include any or all of a service hash type field, a band field, an address bit field, a service hash/Bloom filter bit array field, an AdvA/SeekerA field, a transport availability field, an active transports field, and/or a transport type field.

At 1204, the device may receive, via the BTLE interface, a second message from the neighboring wireless station that indicates that the neighboring wireless device intends to subscribe to or provide the Wi-Fi service(s). In some embodiments, the second message may include a second data structure that indicates that the neighboring wireless device intends to subscribe to or provide the Wi-Fi service(s). In some embodiments, the second message may further include information indicating that the neighboring wireless station has activated a Wi-Fi interface for peer-to-peer communications with the device.

In some embodiments, the device may transmit, via the BTLE interface, a third message to the neighboring wireless station that indicates that the device has activated a Wi-Fi interface for communications with the neighboring wireless station. In some embodiments, the third message may include a third data structure indicating that the wireless station has activated a Wi-Fi interface for communications with the neighboring wireless station. In some embodiments, the third data structure may include any or all of a transport availability field, an active transport field, a service hash type field, a band support field, an address bit field, a reserved field, a service hash/Bloom filter bit array field, an AdvA or SeekA field, a transport type field, and/or a transport specific information field. In some embodiments, the third data structure may include any or all of a general format field, a NAN specific information field, a peer-to-peer specific information field, an infrastructure specific information field, and/or a vendor specific information field. In some embodiments, the device may perform peer-to-peer communications with the neighboring wireless station. In some embodiments, the device may perform the peer-to-peer communications with the neighboring wireless station according to the neighbor awareness networking protocol.

In some embodiments, the first message may include (e.g., in the first data structure) one or more bits indicating how to interpret a value of the service hash. In some embodiments, the one or more bits may further indicate how to interpret octets of a Bloom filter.

In some embodiments, one of the service hash and an octet of a Bloom filter may indicate an operation associated with the Wi-Fi service. In some embodiments, the operation may include one of a single publish operation with one Wi-Fi service, a single publish operation with multiple Wi-Fi services, a single subscribe operation with one Wi-Fi service, a single subscribe operation with multiple Wi-Fi services, a concurrent (or substantially concurrent) publish and subscribe operation with one subscribe Wi-Fi service and one publish Wi-Fi service, a concurrent (or substantially concurrent) publish and subscribe operation with multiple publish and subscribe Wi-Fi services, sending a response in responding to a subscribe or publish operation when there is a service match to turn on a relevant Wi-Fi interface, and/or directly turning on a relevant Wi-Fi interface during a publish and/or subscribe operation. In some embodiments, the operation may include one of a single publish operation with one Wi-Fi service via a service hash value, a single publish operation with multiple Wi-Fi services via multiple service hash values, a single publish operation with multiple Wi-Fi services via a six octet Bloom filter, a single publish operation with multiple Wi-Fi services via a twelve octet Bloom filter, a single subscribe operation with one Wi-Fi service via a service hash value, a single subscribe operation with multiple Wi-Fi services via multiple service hash values, a single subscribe operation with multiple Wi-Fi services via a six octet Bloom filter, a single subscribe operation with multiple Wi-Fi services via a twelve octet Bloom filter, concurrent (or substantially concurrent) publish and subscribe operation with one subscribe Wi-Fi service and one publish Wi-Fi service via a twelve octet Bloom filter, and/or concurrent (or substantially concurrent) publish and subscribe operation with multiple Wi-Fi services in each operation via multiple service hash values.

Figure 13:
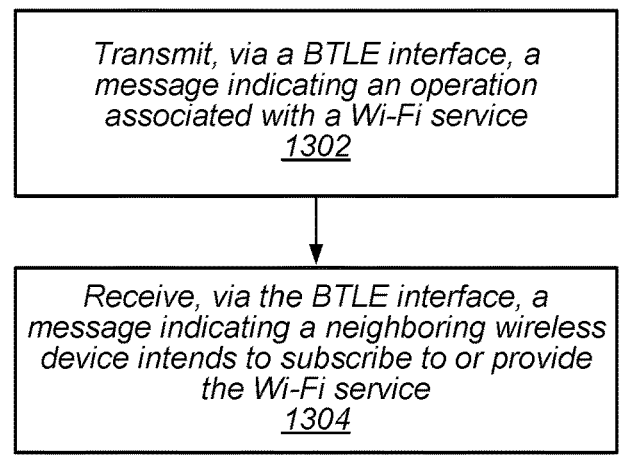

FIG. 13 illustrates a block diagram of an example of another method for service discovery via Bluetooth Low Energy, according to some embodiments. The method shown in FIG. 13 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1302, a device (or a memory medium, a processor, and/or an integrated circuit of the device), such as client station 106, may transmit (or send), via a Bluetooth Low Energy (BTLE) or Bluetooth interface, a first message to a neighboring wireless station that indicates an operation associated with a Wi-Fi service (e.g., a service available via a Wi-Fi interface and/or Wi-Fi related interface parameters). In some embodiments, the indication may be included in a first data structure. In some embodiments, a service hash may be included in the first data structure and the service hash may indicate the operation associated with the Wi-Fi service. In some embodiments, the first data structure may indicate availability of the Wi-Fi service(s). In some embodiments, the first data structure may include any or all of a transport availability field, an active transport field, a service hash type field, a band support field, an address bit field, a reserved field, a service hash/Bloom filter bit array field, an AdvA or SeekA field, a transport type field, and/or a transport specific information field. In some embodiments, the first data structure may include any or all of a general format field, a NAN specific information field, a peer-to-peer specific information field, an infrastructure specific information field, and/or a vendor specific information field.

In some embodiments, the general format field may include any or all of a service hash type field, a band field, an address bit field, a service hash/Bloom filter bit array field, an AdvA/SeekerA field, a transport availability field, an active transports field, and/or a transport type field.

At 1304, the device may receive, via the BTLE interface, a second message from the neighboring wireless station that indicates that the neighboring wireless device intends to subscribe to or provide the Wi-Fi service(s). In some embodiments, the second message may include a second data structure that indicates that the neighboring wireless device intends to subscribe to or provide the Wi-Fi service(s). In some embodiments, the second message may further include information indicating that the neighboring wireless station has activated a Wi-Fi interface for peer-to-peer communications with the device.

In some embodiments, the device may transmit, via the BTLE interface, a third message to the neighboring wireless station that indicates that the device has activated a Wi-Fi interface for communications with the neighboring wireless station. In some embodiments, the third message may include a third data structure indicating that the wireless station has activated a Wi-Fi interface for communications with the neighboring wireless station. In some embodiments, the third data structure may include any or all of a transport availability field, an active transport field, a service hash type field, a band support field, an address bit field, a reserved field, a service hash/Bloom filter bit array field, an AdvA or SeekA field, a transport type field, and/or a transport specific information field. In some embodiments, the third data structure may include any or all of a general format field, a NAN specific information field, a peer-to-peer specific information field, an infrastructure specific information field, and/or a vendor specific information field. In some embodiments, the device may perform peer-to-peer communications with the neighboring wireless station. In some embodiments, the device may perform the peer-to-peer communications with the neighboring wireless station according to the neighbor awareness networking protocol.

In some embodiments, the first message may include (e.g., in the first data structure) a service hash and/or a Bloom filter to indicate the operation. In some embodiments, the first message may include one or more bits indicating how to interpret a value of the service hash. In some embodiments, the one or more bits may further indicate how to interpret octets of a Bloom filter.

In some embodiments, one of the service hash and the Bloom filter may indicate an operation associated with the Wi-Fi service. In some embodiments, the operation may include one of a single publish operation with one Wi-Fi service, a single publish operation with multiple Wi-Fi services, a single subscribe operation with one Wi-Fi service, a single subscribe operation with multiple Wi-Fi services, a concurrent (or substantially concurrent) publish and subscribe operation with one subscribe Wi-Fi service and one publish Wi-Fi service, a concurrent (or substantially concurrent) publish and subscribe operation with multiple publish and subscribe Wi-Fi services, sending a response in responding to a subscribe or publish operation when there is a service match to turn on a relevant Wi-Fi interface, and/or directly turning on a relevant Wi-Fi interface during a publish and/or subscribe operation. In some embodiments, the operation may include one of a single publish operation with one Wi-Fi service via a service hash value, a single publish operation with multiple Wi-Fi services via multiple service hash values, a single publish operation with multiple Wi-Fi services via a six octet Bloom filter, a single publish operation with multiple Wi-Fi services via a twelve octet Bloom filter, a single subscribe operation with one Wi-Fi service via a service hash value, a single subscribe operation with multiple Wi-Fi services via multiple service hash values, a single subscribe operation with multiple Wi-Fi services via a six octet Bloom filter, a single subscribe operation with multiple Wi-Fi services via a twelve octet Bloom filter, concurrent (or substantially concurrent) publish and subscribe operation with one subscribe Wi-Fi service and one publish Wi-Fi service via a twelve octet Bloom filter, and/or concurrent (or substantially concurrent) publish and subscribe operation with multiple Wi-Fi services in each operation via multiple service hash values.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   a Wi-Fi interface;
   a Bluetooth interface;
   at least one radio in communication with the at least one antenna and configured to perform short range communications via either or both of the Wi-Fi interface and the Bluetooth interface; and
   at least one processor in communication with the at least one radio;
   wherein the wireless station is configured to:
      transmit, via the Bluetooth interface, a first message to a neighboring wireless station, wherein the first message comprises a first data structure indicating availability of a Wi-Fi service via the Wi-Fi interface, one or more Wi-Fi related interface parameters, and wherein the first data structure comprises at least one of a service hash or a Bloom filter, wherein one of the service hash or Bloom filter provides an indication of an operation associated with the Wi-Fi service, wherein the operation comprises one or more of a publish operation or a subscribe operation, wherein the publish operation comprises at least a single publish operation of a Wi-Fi service, and wherein the subscribe operation comprises at least a single subscribe operation of a Wi-Fi service; and
      receive, via the Bluetooth interface, a second message from the neighboring wireless station, wherein the second message comprises a second data structure indicating that the neighboring wireless device intends to subscribe to the service.

2. The wireless station of claim 1,
wherein the first data structure comprises one or more of:
   a transport availability field;
   an active transport field;
   a service hash type field;
   a band support field;
   an address bit field;
   a reserved field;
   an AdvA or SeekA field;
   a transport type field; or
   a transport specific information field; and
wherein the second data structure comprises one or more of:
   a transport availability field;
   an active transport field;
   a service hash type field;
   a band support field;
   an address bit field;
   a reserved field;
   a service hash/Bloom filter bit array field;
   an AdvA or SeekA field;
   a transport type field; or
   a transport specific information field.

3. The wireless station of claim 1,
wherein the first data structure comprises one or more of:
   a general format field;
   a NAN specific information field;
   a peer-to-peer specific information field;
   an infrastructure specific information field; or
   a vendor specific information field; and
wherein the second data structure comprises one or more of:
   a general format field;
   a NAN specific information field;
   a peer-to-peer specific information field;
   an infrastructure specific information field; or
   a vendor specific information field.

4. The wireless station of claim 3,
wherein the general format field includes one or more of:
   a service hash type field;
   a band field;
   an address bit field;
   a service hash/Bloom filter bit array field;
   an AdvA/SeekerA field;
   a transport availability field;
   an active transports field; or
   a transport type field.

5. The wireless station of claim 1,
wherein the second data structure further comprises an indication that the neighboring wireless station has activated its Wi-Fi interface for peer-to-peer communications.

6. The wireless station of claim 5,
wherein the wireless station is further configured to:
   transmit, via the Bluetooth interface, a third message to the neighboring wireless station, wherein the third message comprises a third data structure indicating that the wireless station has activated the Wi-Fi interface for peer-to-peer communications with the neighboring wireless station.

7. The wireless station of claim 6,
wherein the wireless station is further configured to:
  perform, via the Wi-Fi interface, peer-to-peer communications with the neighboring wireless station, wherein the peer-to-peer communications are based at least in part on information exchanged via the first, second, and third data structures.

8. The wireless station of claim 1,
wherein the first data structure includes one or more bits indicating how to interpret a value of a service hash associated with the Wi-Fi service available via the Wi-Fi interface.

9. An apparatus, comprising:
a memory; and
at least one processor in communication with the memory;
wherein the at least one processor is configured to:
  generate instructions to transmit, via a Bluetooth low energy (BTLE) interface, a first message to a neighboring wireless station, wherein the first message comprises a service hash or a Bloom filter associated with a Wi-Fi service available via a Wi-Fi interface in communication with the at least one processor wherein the first message further comprises an indication of an operation associated with the Wi-Fi service, wherein one of the service hash or the Bloom filter indicate the operation associated with the Wi-Fi service, wherein the operation comprises one or more of a publish operation or a subscribe operation, wherein the publish operation comprises at least a single publish operation of a Wi-Fi service, and wherein the subscribe operation comprises at least a single subscribe operation of a Wi-Fi service; and
  receive, via the BTLE interface, a second message from the neighboring wireless station, wherein the second message indicates that the neighboring wireless device intends to subscribe to or provide the Wi-Fi service associated with the service hash.

10. The apparatus of claim 9,
wherein the first message includes one or more bits indicating how to interpret a value of the service hash.

11. The apparatus of claim 9,
wherein the one or more bits further indicate how to interpret octets of the Bloom filter included in the first message and associated with the service.

12. The apparatus of claim 9,
wherein the operation further comprises one of:
  a single publish operation with multiple Wi-Fi services;
  a single subscribe operation with multiple services;
  a substantially concurrent publish operation with one Wi-Fi service and subscribe operation with one Wi-Fi service;
  a substantially concurrent publish operation with multiple Wi-Fi services and subscribe operation with multiple Wi-Fi services;
  generating instructions to transmit, via the BTLE interface, a response to a subscribe or publish operation when there is a service match to turn on an interface; or
  enabling the Wi-Fi interface during a publish and/or subscribe operation.

13. The apparatus of claim 9,
wherein the second message further indicates that the neighboring wireless device has activated its Wi-Fi interface for peer-to-peer communications.

14. The apparatus of claim 9,
wherein the at least one processing element is further configured to:
  generate instructions to transmit, via the BTLE interface, a third message to the neighboring wireless station, wherein the third message indicates activation of the Wi-Fi interface for peer-to-peer communications with the neighboring wireless station.

15. A non-transitory computer readable memory medium storing program instructions executable by a processor to:
  generate instructions to transmit, via a Bluetooth low energy (BTLE) interface, a first message to a neighboring wireless station, wherein the first message indicates an operation associated with a Wi-Fi service available via a Wi-Fi interface in communication with the processor, wherein the first message further comprises one of a service hash or a Bloom filter to indicate the operation associated with the Wi-Fi service, wherein the operation comprises one or more of a publish operation or a subscribe operation, wherein the publish operation comprises at least a single publish operation of a Wi-Fi service, and wherein the subscribe operation comprises at least a single subscribe operation of a Wi-Fi service; and
  receive, via the BTLE interface, a second message from the neighboring wireless station, wherein the second message indicates that the neighboring wireless device intends to subscribe to or provide the service.

16. The non-transitory computer readable memory medium of claim 15,
wherein the first message further comprises one or more bits indicating how to interpret one of a service hash value associated with the service hash or octets of the Bloom filter.

17. The non-transitory computer readable memory medium of claim 15,
wherein the operation further comprises one of:
  a single publish operation with multiple Wi-Fi services via multiple service hash values comprised in the first message;
  a single publish operation with multiple Wi-Fi services via a six octet Bloom filter comprised in the first message;
  a single publish operation with multiple Wi-Fi services via a twelve octet Bloom filter comprised in the first message;
  a single subscribe operation with multiple Wi-Fi services via multiple service hash values comprised in the first message;
  a single subscribe operation with multiple Wi-Fi services via a six octet Bloom filter comprised in the first message;
  a single subscribe operation with multiple Wi-Fi services via a twelve octet Bloom filter comprised in the first message;
  a substantially concurrent publish operation with one Wi-Fi service and subscribe operation with one Wi-Fi service via a twelve octet Bloom filter comprised in the first message; or
  a substantially concurrent publish operation with multiple Wi-Fi services and subscribe operation with multiple Wi-Fi services via multiple service hash values comprised in the first message.

18. The non-transitory computer readable memory medium of claim 15,
wherein the instructions are further executable to:
  generate instructions to transmit, via the BTLE interface, a third message to the neighboring wireless station, wherein the third message indicates activation of the Wi-Fi interface for peer-to-peer communications with the neighboring wireless station.

19. The wireless station of claim 1,
wherein the first message further comprises one or more bits indicating how to interpret one of a service hash value associated with the service hash or octets of the Bloom filter.

20. The non-transitory computer readable memory medium of claim 15,
wherein the second message further indicates that the neighboring wireless device has activated its Wi-Fi interface for peer-to-peer communications.

* * * * *